(12) United States Patent
Mishli et al.

(10) Patent No.: US 10,666,432 B2
(45) Date of Patent: May 26, 2020

(54) SYSTEM AND METHOD OF SECURING DEVICES USING ENCRYPTION KEYS

(71) Applicant: UNBOUND TECH LTD., Petah Tiqva (IL)

(72) Inventors: Oz Mishli, Kfar Saba (IL); Guy Pe'er, Talmei Yechiel (IL); Michael Vakulenko, Zichron Yaacov (IL)

(73) Assignee: UNBOUND TECH LTD., Petah Tiqva (IL)

( * ) Notice: Subject to any disclaimer, the term of this patent is extended or adjusted under 35 U.S.C. 154(b) by 0 days.

(21) Appl. No.: 16/424,675

(22) Filed: May 29, 2019

(65) Prior Publication Data
US 2019/0280857 A1 Sep. 12, 2019

Related U.S. Application Data

(63) Continuation of application No. PCT/IL2017/051302, filed on Nov. 30, 2017.

(60) Provisional application No. 62/427,829, filed on Nov. 30, 2016.

(51) Int. Cl.
| | |
|---|---|
| *H04L 9/08* | (2006.01) |
| *G06F 21/44* | (2013.01) |
| *H04L 29/06* | (2006.01) |
| *H04W 12/04* | (2009.01) |
| *H04W 12/00* | (2009.01) |

(52) U.S. Cl.
CPC ............. *H04L 9/085* (2013.01); *G06F 21/44* (2013.01); *H04L 63/062* (2013.01); *H04L 63/0884* (2013.01); *H04W 12/001* (2019.01); *H04W 12/04* (2013.01); *H04L 2209/46* (2013.01)

(58) Field of Classification Search
CPC ... H04L 9/085; H04L 63/062; H04L 63/0884; H04L 2209/46; H04W 12/04; G06F 21/44
See application file for complete search history.

(56) References Cited

U.S. PATENT DOCUMENTS 5,150,412 A * 9/1992 Maru ................. H04W 12/0013
380/43
2014/0089669 A1    3/2014 Papillon et al.
2014/0331294 A1* 11/2014 Ramallo ............. G06F 21/6245
726/5

FOREIGN PATENT DOCUMENTS

WO    2016135737 A1    9/2016
WO    2016172492 A1    10/2016

* cited by examiner

*Primary Examiner* — Ellen Tran
(74) *Attorney, Agent, or Firm* — Alphapatent Associates, Ltd; Daniel J. Swirsky

(57) ABSTRACT

The subject matter discloses a method and a system for securely distributing a credential and encryption keys for physical devices. The system comprises a security server and a physical device. the physical device comprises a memory module configured to store a share of the credential, a communication module configured to exchange signals, and a processing module configured to execute calculations upon request received on a wireless manner via the communication module from the security server, the calculations are transmitted to the security server to execute a multi-party computation process. The multi-party computation process outputs two shares of the credential, a first share is stored in the physical device. The physical device does not have access to the credential.

18 Claims, 4 Drawing Sheets

| PHYSICAL DEVICE 210 | INTERMEDIATE ENTITY 220 | SECURITY SERVER 230 |
|---|---|---|
| Security agent 212 | User interface 222 | User interface 232 |
| Comm. Module 215 | Comm. Module 225 | Comm. Module 235 |
| MPC Module 218 | Internet gateway module 228 | Internet gateway module 238 |
| Memory Module 219 | | Credential database 240 |
| | | MPC module 245 |

FIG. 2

SYSTEM AND METHOD OF SECURING DEVICES USING ENCRYPTION KEYS

FIELD OF THE INVENTION

The present invention generally relates to security of physical devices.

BACKGROUND OF THE INVENTION

Today, when manufacturing physical devices, such as Internet of Things (IoT) related devices that contain secure credentials, there is a serious challenge with supply chain data security. The cryptographic credentials, such as passwords, encryption keys and the like that are loaded into the device are very sensitive; compromise/leak of these credentials is fatal, effectively collapsing the entire security model. The problem is intensified through the supply chain, where often the manufacturing facilities (where credentials are typically loaded) and/or personnel cannot be trusted.

One of the key principles of end-to-end IoT security is the integrity and trust level of device credentials, hence their protection is in the foundation of IoT security. There are many challenges associated with protecting secrets in general, and particularly with IoT devices. Software obfuscation offers limited protection against hackers. Hardware-based protection has many challenges—additional BoM costs, board layout modifications for existing devices, fragmentation among IoT device versions, models and makers and expensive private key protection procedures during device provisioning at manufacturing or commissioning facilities that are often overseas.

The challenges detailed above result from the introduction of dedicated HW that should be integrated, provisioned, deployed to a huge mix of different devices and platforms.

SUMMARY OF THE INVENTION

The present invention discloses a computerized system and method for securely distributing credentials and encryption keys for physical devices, for example IoT devices. The method can be performed throughout the supply chain or later, when a person wishes to add cryptographic credentials to the device he/she purchased. This distribution can be initiated remotely or on-site, and at various parts of the supply chain.

The system comprises a module in the physical device, for example a software, hardware or firmware module, configured to interact with a message received from another device. The module can extract credentials from the message and use the credentials when necessary, for example when authentication of the physical device is required. The physical device may also comprise a communication module configured to receive the message, either from a security server having access to the internet, or from an intermediate entity located closer to the physical device, for example via Bluetooth communication.

The system also comprises a multi-party computation (MPC) module configured to compute two or more shares of the credential, send one share to the physical device and store another share associated with the device identifier in a credential database. This way, the physical device receives only a portion of the credential and the manufacturer or personnel associated with manufacturing the physical device cannot compromise the credential. Such credential may be an encryption key. The cryptographic credential operations (such as credential creation, usage etc.) disclosed in present invention may be performed without ever bringing the entire credential together in one place, such as the server or the physical device.

The system may also comprise an intermediate entity configured to communicate with both the security server and the physical device, in case the physical device lacks internet access or any other predefined ability required to communicate directly with the server. In such case, the credential share is sent from the security server to the intermediate entity, which transmits the credential share to the physical device.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2 shows a computerized environment for provisioning keys into physical devices that lack communication connectivity, according to exemplary embodiments of the present invention;

DETAILED DESCRIPTION

The present invention discloses a computerized system and method for securely distributing credentials and encryption keys for physical devices, for example IoT devices. The credentials may be distributed during the manufacture process of the physical device or after, for example by a person using the device or a person who purchased the device. The credential is divided into shares that are stored in different entities, for example one share is stored in the physical device and the other share is stored in a security server, while no entity has access to a share not stored therein. This way, a secret associated with a physical device, for example an encryption key or a password, can be generated, used etc. without ever being unified, even during the provisioning process. Specifically, as part of the provisioning process, the key is generated in a distributed manner using Multi-Party Computation (MPC), in which one share is stored on the security server and another share is stored on the physical device. This way, the entire key never exists in a single entity.

Figure 1:
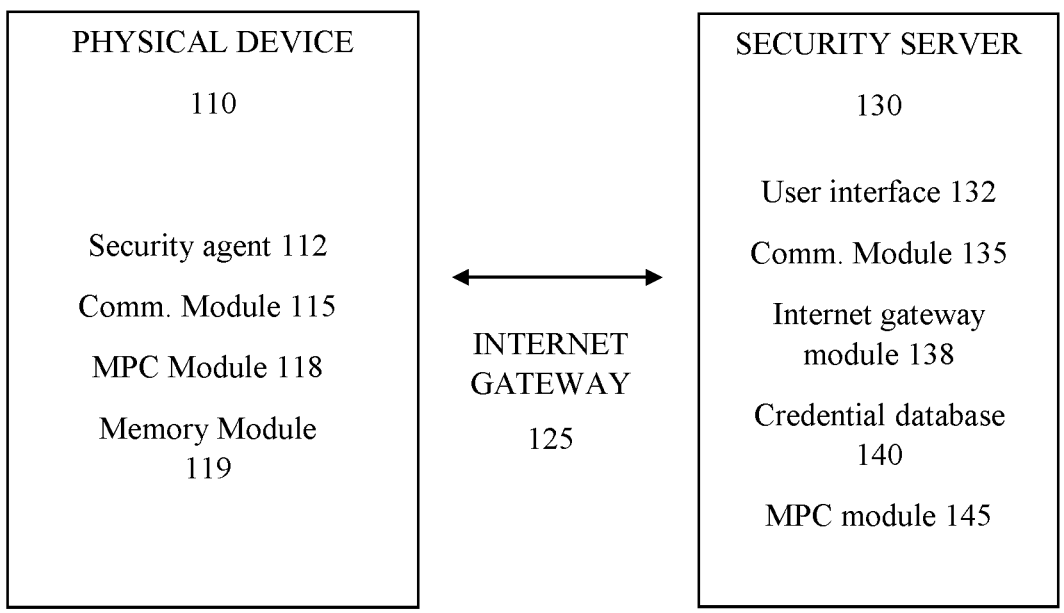
FIG. 1 shows a computerized environment for provisioning keys into physical devices having communication connectivity, according to exemplary embodiments of the present invention.

FIG. 1 shows a computerized environment for provisioning keys into physical devices having communication connectivity, according to exemplary embodiments of the present invention. The term communication connectivity relates to a variety of communication protocols and techniques, for example Local Access Network (LAN), Wide Access Network (WAN), internet access, internet protocol, Bluetooth, ZigBee and the like.

The physical device 110 may be a device having electronic capabilities, for example a device capable of generating or transmitting information to another device, either wirelessly or via a wired channel. The physical device 110 may be an internet of things (IoT) device, a sensor, and the like. The physical device 110 may comprise a display device for displaying information. The physical device 110 may comprise an input unit enabling its user to input information into the physical device 110.

The physical device 110 comprises a security agent 112 embedded therein, configured to perform security-related operations. For example, the security agent 112 processes a message received via communication module 115, said message comprises a share of a credential to be used by the physical device 110 or by a user of the physical device. The security module 112 may also comprise an MPC module 118 configured to perform multi party computations by exchanging information with the security server 130. For example, the credential may be used to authenticate the physical device 110 before an application server such as an e-commerce web, an online storage server, messaging server and the like.

The process of distributing a credential to the physical device is initiated by a person or by a computerized mechanism, for example a user of the physical device 110 or a mechanism located at the end of an assembly line used to manufacture the physical device 110. The request is sent to the security server 130 via internet gateway 125. The security server 130 runs an MPC process using MPC module 145. The MPC module 118 of the physical device 110 cooperates with the MPC module 145 of the security server 130 to output two shares of the credential. The two shares are never stored in a single device during or after the credential creation process. At the end of the MPC process, one share is stored at the memory module 118 of the physical device 110 and the other share is stored in the credential database 140 of the security server 130. The memory module 118 may be either volatile memory or non-volatile memory. The credential database 140 may be stored in the cloud or in a physical server. The credential database 140 stores shares of credentials associated with an identifier of a physical device, for example a mac address of a smartphone, a serial number of a wearable device and the like. Thus, authenticating the physical device 110 by a third party is performed using the share stored in the physical device 110 and the share stored in the credential database 140. The credential is not created in a whole, or stored in a whole during the entire process or generating the shares and using the shares for authentication. That is, the key material never exists thorough the full lifecycle of the key, but can be used by the physical device 110, for example to sign authentication token, without ever bringing the shares together.

The security server 130 may also comprise a user interface 132 configured to enable a person to interact with the security server 130. The user interface 132 may be embedded in an electronic device such as a mobile phone, personal computer, laptop, tablet and the like, and communicate with the security server 130 via internet gateway module 138.

FIG. 2 shows a computerized environment for provisioning keys into physical devices that lack communication connectivity, according to exemplary embodiments of the present invention. It should be noted that the intermediate entity can be used also in case the physical device has communication connectivity. The environment shows the physical device 210, a security server 230 and an intermediate entity 220. The physical device 210 may be a device having electronic capabilities, for example a device capable of generating or transmitting information to another device, either wirelessly or via a wired channel. The physical device 210 may be an internet of things (IoT) device, a sensor, and the like. The physical device 210 may comprise a display device for displaying information. The physical device 210 may comprise an input unit enabling its user to input information into the physical device 210.

The physical device 210 comprises a security agent 212 embedded therein, configured to perform security-related operations. For example, the security agent 212 processes a message received via communication module 215, said message comprises a share of a credential to be used by the physical device 210 or by a user of the physical device. The security module 212 may also comprise an MPC module 218 configured to perform multi party computations by exchanging information with the security server 230. For example, the credential may be used to authenticate the physical device 210 before an application server such as an e-commerce web, an online storage server, messaging server and the like.

The process of distributing a credential to the physical device is initiated by a person or by a computerized mechanism, for example a user of the physical device 210 or a mechanism located at the end of an assembly line used to manufacture the physical device 210. The request is sent to the security server 230 which runs an MPC process using MPC module 245. The MPC module 218 of the physical device 210 cooperates with the security server 230 to output two shares of the credential. The two shares are not stored in a single device during or after the credential creation process. At the end of the MPC process, one share is stored at the memory module 218 of the physical device 210 and the other share is stored in the credential database 240 of the security server 230. The memory module 218 may also store a value representing the usage of the share. The value may be adjusted upon request to use the share. Thus, when cloning the physical device 210, even when obtaining the share, the attacker lacks the updated value as the attacker does not have knowledge of prior use of the credential. The credential database 240 may be stored in the cloud or in a physical server. The credential database 240 stores shares of credentials associated with an identifier of a physical device, for example a mac address of a smartphone, a serial number of a wearable device and the like. Thus, authenticating the physical device 210 by a third party is performed using the share stored in the physical device 210 and the share stored in the credential database 240. The credential is not created in a whole, or stored in a whole during the entire process or generating the shares and using the shares for authentication. That is, the key material never exists thorough the full lifecycle of the key, but can be used by the physical device 210, for example to sign authentication token, without ever bringing the shares together.

The security server 230 may also comprise a user interface 232 configured to enable a person to interact with the security server 230. The user interface 232 may be embedded in an electronic device such as a mobile phone, personal computer, laptop, tablet and the like, and communicate with the security server 230 via internet gateway module 238.

As the physical device 210 lacks internet connectivity, the system disclosed in FIG. 2 further comprises an intermediate entity 220 configured to communicate with both the security server 230 and the physical device 210. The intermediate entity 220 is used when the physical device 210 is unable to communicate with the security server 230, either permanently or temporarily, for example due a technical failure of the physical device 210 or a communication network used by the physical device 210. The intermediate entity 220 may comprise a user interface 222 configured to enable a person to initiate the key distribution process, for example a person involved in the manufacture process of the physical device 210. In such a case, the intermediate entity 220 may be located in the manufacturing site. The intermediate entity 220 also comprises a communication module 225 configured to communicate with the physical device 210 in a non-internet communication channel, for example using wired communication, fiber optics, USB, or wireless communication such as Bluetooth and others. The intermediate entity 20 also comprises an internet gateway module 228 configured to communicate with the security server 230, receive messages from the security server 230, for example a message comprising a credential share. The internet gateway module 228 may also be used to send a request to generate a credential share to the device. The request is associated with an identifier of the physical device.

The intermediate entity 220 may be an agent running on a personal device, such as a mobile phone or a laptop computer, having internet access to communicate with the security server 230 and another communication mechanism to communicate with the physical device 210. In such case, the agent may be used to provide a credential to the physical device outside the manufacturing site, for example in a store, or after the device is purchased. Credential distribution may be allowed to a limited number of persons or entities, according to predefined rules, for example according to the type or use of the physical device 210.

Figure 3:
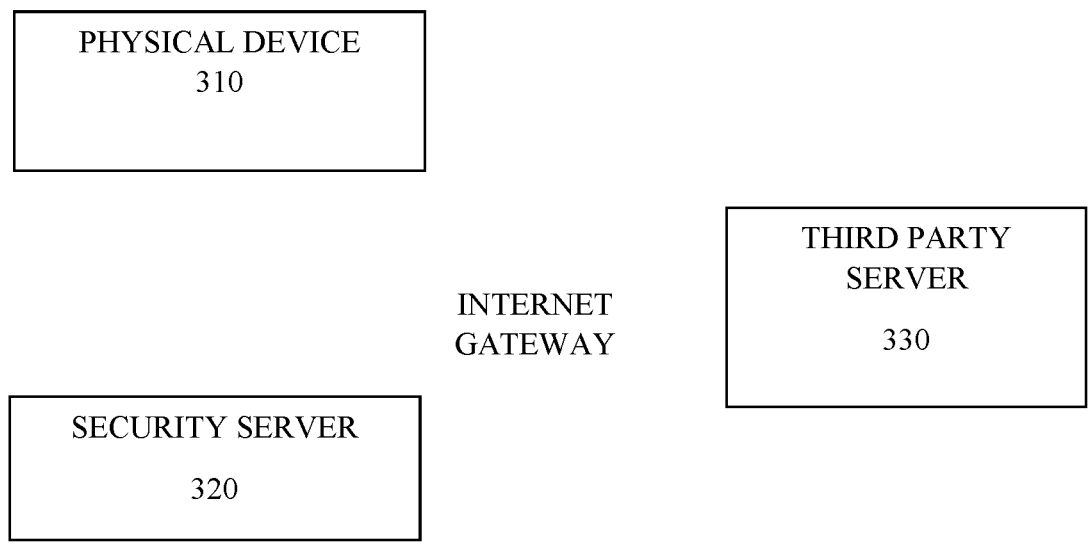
FIG. 3 shows a computerized environment for authenticating physical devices using MPC, according to exemplary embodiments of the present invention; and, FIG. 4 shows a method for provisioning keys into physical devices, according to exemplary embodiments of the present invention.

FIG. 3 shows a computerized environment for authenticating physical devices using MPC, according to exemplary embodiments of the present invention. The computerized environment shows a third party server 330 that requests authentication from the physical device 310. Such authentication may be requested when the physical device 310 wishes to access information in the third party server 330, or input information into the third party server 330, for example uploading values measured over time into an online database when the physical device 310 is a sensor. Thus, the third party server 330 requests the physical device 310 to authenticate itself via a credential. The physical device 310 only has a share of the credential. The physical device 310 and the security server 320 which stores the second share exchange information over the internet to output a result that suffices the authentication process of the third party server without any of the physical device 310, the security server 320 and the third party server 330 having access to the entire credential during the authentication process. In some exemplary cases, the physical device 310 and the security server 320 may frequently refresh the credential shares through the MPC protocol while the entire credential doesn't change. A counter may be held by the physical device and the server to verify the same key version is used, as the key may be refreshed periodically or in response to a predefined event. For example, the counter may indicate that this is the 101th version of the credential. After each refresh performed via MPC, the counter is adjusted in both the physical device 310 and the security server 320, for example by incrementing the value by one (1). This way, cloning of the physical device 310 is prevented.

Figure 4:
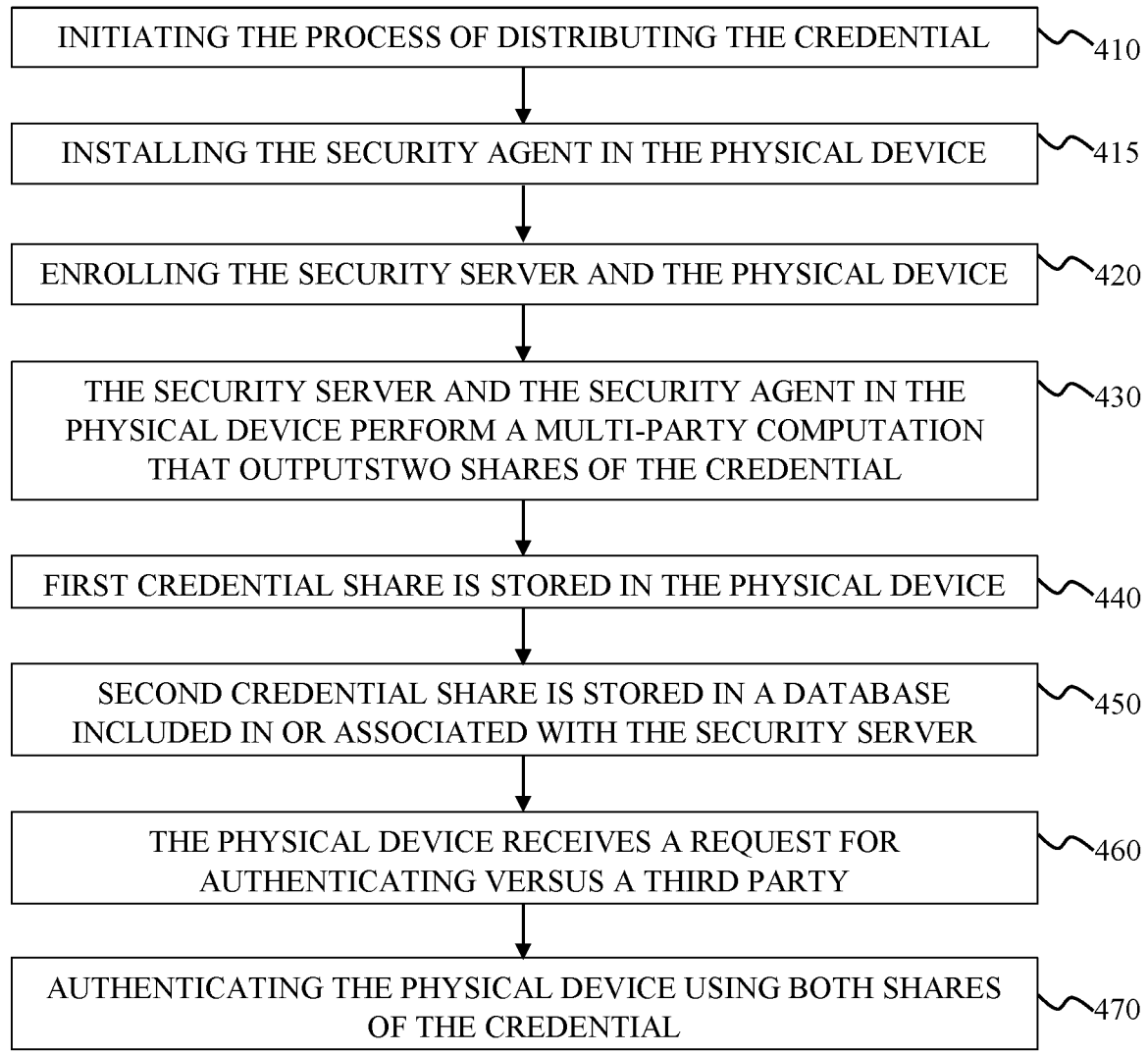

FIG. 4 shows a method for provisioning keys into physical devices, according to exemplary embodiments of the present invention. Step 410 discloses initiating the process of distributing the credential. Initiating comprises sending a request to the security server to generate the credential. The request comprises an identifier of the physical device, such that the share stored at the security server is used when authenticating or validating the specific physical device. Step 415 discloses installing the security agent in the physical device, for example via a USB communication port. Then, in step 420, the security server and the physical device are enrolled, that is trust each other. The enrollment is performed using any method of generating trust between devices, as desired by a person skilled in the art. In step 430, the security server and the security agent in the physical device perform a multi-party computation that outputs two shares of the credential. Each share is useless without the other share. Generation of the two shares is performed without the entire credential ever stored in either the physical device or in the security server. The multi-party computation process may be defined and/or selected as desired by a person skilled in the art. In step 440, a first credential share is stored at the physical device. In step 450, a second credential share is stored in a database included in or associated with the security server. The second credential share is stored along with an identifier of the physical device. In step 460, the physical device receives a request for authenticating versus a third party, for example an application server. The physical device communicates with the security server to generate the credential using the first credential share and the second credential share, for example using an MPC process. Then, in step 470, the physical device is authenticated versus the application server using both shares. The physical device may include communication module such as 4G or Wi-Fi. In some other cases, the physical device may communicate with a server via a local hub as an intermediate entity when authenticating and the MPC process used for authentication is performed via that hub.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A system for securely distributing a credential for physical devices, comprising:
   a security server; and
   a physical device, comprising:
      a memory module configured to store a share of the credential,
      a communication module configured to exchange signals, and
      a Multi-Party Computation (MPC) module configured to perform an MPC process with the security server,
   wherein the MPC process outputs two shares of the credential,
   wherein a first share of the credential is stored in the physical device, and a second share of the credential is stored in the security server,
   wherein the physical device does not have access to the entire credential,
   wherein the physical device receives a request to authenticate to a third party, and
   wherein the security server exchanges information over the internet with the physical device to output a result that enables the authentication process of the third party to authenticate the physical device to the third party without any one of the third party, the physical device and the security server having access to the entire credential.

2. The system of claim 1, wherein the physical device comprises a wireless gateway.

3. The system of claim 1, wherein the security server further comprises a memory configured to store a second share of the credential not stored in the physical device, wherein said second share is associated with an identifier of the physical device storing the first share.

4. The system of claim 1, wherein the security server further comprises a multi-party computation module configured to perform the multi-party computation process with the physical device.

5. The system of claim 1, further comprising an intermediate unit comprising an internet gateway, said internet gateway enabling the physical device to communicate with the security server over the internet.

6. The system of claim 5, wherein the communication module of the physical device and the intermediate unit exchange information via a wired communication mechanism.

7. The system of claim 5, wherein the communication module of the physical device and the intermediate unit exchange information via a short-range wireless communication mechanism.

8. The system of claim 5, wherein the intermediate unit is an electronic device operated by a user of the physical device.

9. The system of claim 5, further comprising multiple distinct physical devices configured to execute a multi-party computation process with the security server, wherein the intermediate unit communicates with at least two of the multiple distinct physical devices, and wherein the intermediate unit transfers information from the at least two of the multiple distinct physical devices to the security server via the internet gateway.

10. The system of claim 5, wherein the intermediate unit comprises a user interface enabling a user to input data into the intermediate unit, said data resulting in initiation of the multi-party computation process.

11. A method for securely distributing a credential uniquely associated with a physical device, comprising:
in a manufacturing phase,
exchanging information between a processing module of the physical device and a security server to cooperatively execute a multi-party computation (MPC) process, wherein the output of the MPC process is two shares of the credential, and
storing one share of the credential in the physical device and another share of the credential in the security server, wherein the other share of the credential is stored in the security server in association with an identifier of the physical device, and wherein the physical device does not have access to the entire credential; and
in a usage phase,
the physical device receiving a request to authenticate to a third party, and
the security server exchanging information over the internet with the physical device to output a result that enables the authentication process of the third party to authenticate the physical device to the third party without any one of the third party, the physical device and the security server having access to the entire credential.

12. The method of claim 11, further comprising receiving a request to initiate the multi-party computation process, said request comprising an identifier of the physical device, such that the share stored at the security server is used when authenticating or validating the specific physical device.

13. The method of claim 11, further comprising associating an identifier of the physical device with the second share stored in the security server.

14. The method of claim 11, further comprising:
storing a message counter in both the physical device and the security server, wherein said message counter represents a usage of the share of the credential stored in the physical device;
adjusting the message counter in both the physical device and the security server upon use of the share versus the third party; and
authenticating the physical device only if the value stored in both the physical device and the security server is equal.

15. The method of claim 11, further comprising installing the share of the credential in the physical device using a physical communication port.

16. The method of claim 11, wherein the physical device is an IoT device comprising a sensor, wherein the IoT device wishes to authenticate to the third party to send information collected by the sensor.

17. The method of claim 11, further comprising frequently refreshing the credential shares using the MPC process while the entire credential does not change.

18. The method of claim 17, further comprising verifying the same credential version is used in the MPC process using a counter stored in both the physical device and the security server.

* * * * *